US011724191B2

(12) United States Patent
Karlsson et al.

(10) Patent No.: US 11,724,191 B2
(45) Date of Patent: Aug. 15, 2023

(54) NETWORK-BASED VIDEO GAME EDITING AND MODIFICATION DISTRIBUTION SYSTEM

(71) Applicant: Electronic Arts Inc., Redwood City, CA (US)

(72) Inventors: Per Henrik Benny Karlsson, North Vancouver (CA); Joseph Steven Pribele, Port Moody (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 228 days.

(21) Appl. No.: 17/188,986

(22) Filed: Mar. 1, 2021

(65) Prior Publication Data
US 2021/0252401 A1 Aug. 19, 2021

Related U.S. Application Data

(63) Continuation of application No. 16/370,815, filed on Mar. 29, 2019, now Pat. No. 10,933,327.

(51) Int. Cl.
| | | |
|---|---|---|
| A63F 13/00 | (2014.01) | |
| A63F 13/63 | (2014.01) | |
| A63F 13/537 | (2014.01) | |
| A63F 13/35 | (2014.01) | |
| G06F 9/451 | (2018.01) | |

(52) U.S. Cl.
CPC .............. *A63F 13/63* (2014.09); *A63F 13/35* (2014.09); *A63F 13/537* (2014.09); *G06F 9/451* (2018.02)

(58) Field of Classification Search
CPC ........ A63F 13/63; A63F 13/35; A63F 13/537; A63F 13/69; A63F 13/77; A63F 13/60; A63F 2009/241; G06F 9/451; G06F 8/60
See application file for complete search history.

(56) References Cited

U.S. PATENT DOCUMENTS

| | | | |
|---|---|---|---|
| 6,115,036 A | * | 9/2000 | Yamato .................. A63F 13/63 715/723 |
| 6,837,789 B2 | | 1/2005 | Garahi et al. |
| 10,933,327 B2 | | 3/2021 | Karlsson et al. |
| 2002/0143625 A1 | | 10/2002 | Waldeyer |
| 2007/0233585 A1 | | 10/2007 | Ben Simon et al. |
| 2009/0318221 A1 | | 12/2009 | Dhunjishaw et al. |
| 2010/0022308 A1 | | 1/2010 | Hartmann et al. |
| 2011/0319169 A1 | | 12/2011 | Lam et al. |
| 2012/0079126 A1 | | 3/2012 | Evans et al. |
| 2020/0310783 A1 | * | 10/2020 | Schmidt .................. G06F 8/658 |
| 2021/0001229 A1 | * | 1/2021 | Somers .................. A63F 13/35 |
| 2022/0058011 A1 | * | 2/2022 | Scheinkman ........... G06F 8/658 |
| 2022/0219090 A1 | * | 7/2022 | Smith .............. H04N 21/21805 |

(Continued)

*Primary Examiner* — Dmitry Suhol
*Assistant Examiner* — Jason Pinheiro
(74) *Attorney, Agent, or Firm* — Knobbe, Martens, Olson & Bear, LLP

(57) ABSTRACT

Embodiments of the present application provide a network-based game modification system. The network based game modification system can provide users with access to game application source data and editing tools through a game editor client. The game editor client can provide an interface by which the developers can provide access to public source data while preventing access to private game source data. Additionally, the game editor client can provide an interface for access to some of the developers tools.

20 Claims, 9 Drawing Sheets

(56) References Cited

U.S. PATENT DOCUMENTS

2022/0245131 A1\* 8/2022 Loeb .................... G06F 11/364
2022/0305390 A1\* 9/2022 Tripathi ................ A63F 13/795
2022/0350576 A1\* 11/2022 Mallat ................ H03M 7/3059

\* cited by examiner

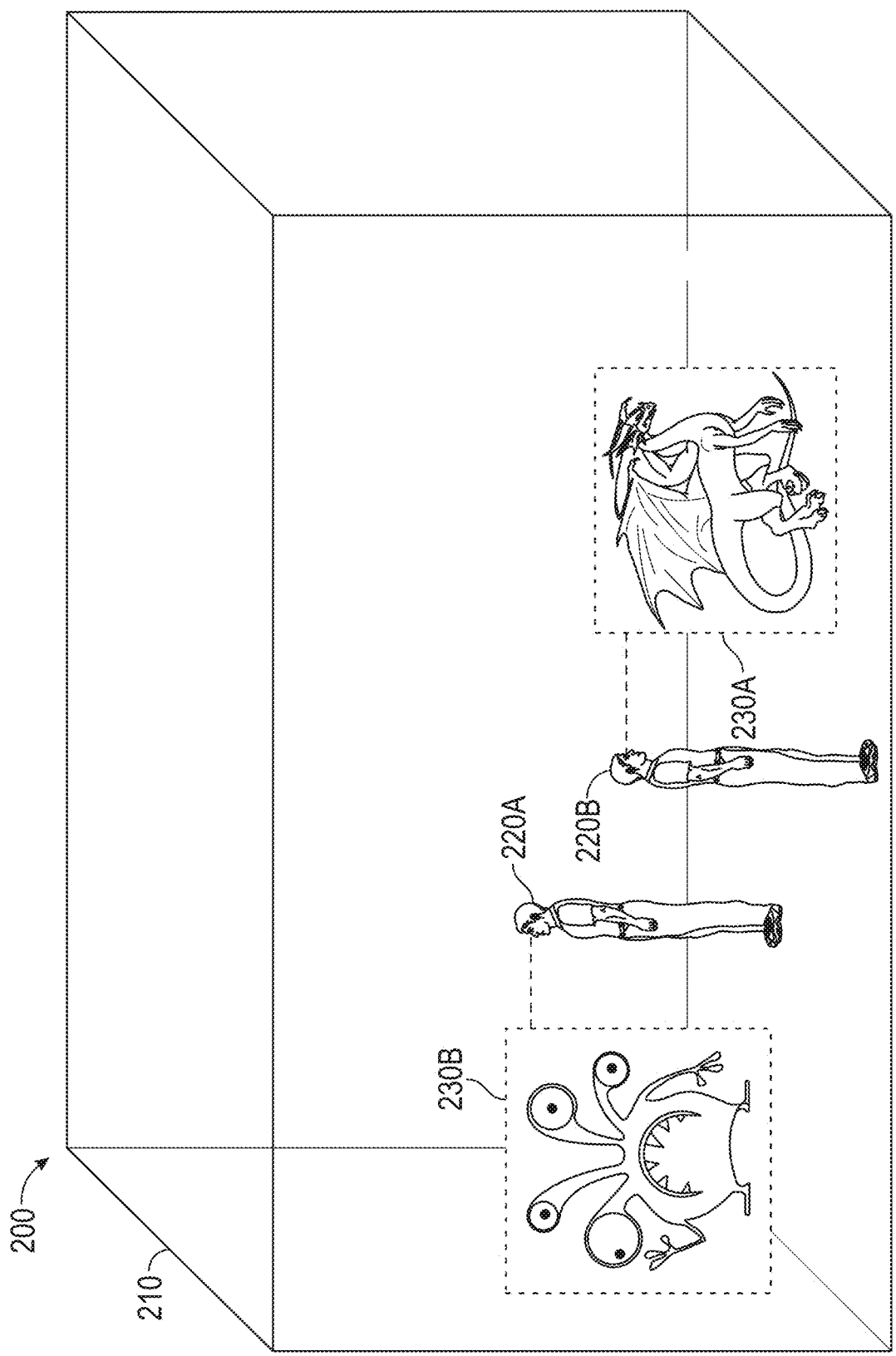

NETWORK-BASED VIDEO GAME EDITING AND MODIFICATION DISTRIBUTION SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Many times after a video game is released, users of the video game will make changes and tweaks to the video game. Sometimes the modification will be simple changes, such as changing the names or characters, or colors within the game, sometimes the changes will be more significant, such as changing the character models, enemies, storylines, maps, and other changes Modifying a game generally requires that the user download a game engine or game development kit associated with the video game and the source development data for video game. The source development data for a video game can sometimes be hundreds of gigabytes. After the user has made the modifications, the user can build a modification file (generally referred to as a "mod"). The mod build process is done using the resources of the user's computing system. The mod can then be uploaded onto a $3^{rd}$ party mod sharing site, which can then be downloaded by different users. The ability to make mods is generally limited to mod-friendly games, in which the developer voluntarily shares the source code and allows the community to download it in order to generate a mod. However, many games do not provide the ability to make mods or provide any legitimate tools for the modification of a video game.

SUMMARY OF EMBODIMENTS

The systems, methods, and devices of this disclosure each have several innovative aspects, no single one of which is solely responsible for the all of the desirable attributes disclosed herein.

One embodiment discloses a computer-implemented method for editing game content within a game application, the method comprising: by a server computing system comprising at least one hardware processor configured with computer executable instructions, receiving a request to initiate edit a first game application from a user computing system, wherein the request is generated by a game editor client application installed on the user computing system that is remote to the server computing system and communicate with the server computing system using a public communication channel; determining a first computing profile of the user computing system; determining a first subset of game editing tools available to the user computing system based at least in part the first game application and the first computing profile, wherein the first subset of editing tools is a subset of a plurality of editing tools available for editing the first game application; providing a first user interface including the first subset of game editing tools within the game editor application; providing access to a first subset of game assets of the first game application, wherein the first subset of game assets are assets used during execution of the game application and are designated as publicly accessible; receiving a request to modify at a first game asset of the first subset of game assets, the game asset being modified using a first game editing tool of the first subset of game editing tools; and modifying the first game asset based on the request resulting in a modified first game asset.

Various embodiments of the system may include one, all, or any combination of the following features. In some embodiments, the first subset of game editing tools includes game editing tools that were previously installed on the user computing system, wherein the game editor application interfaces with the previously installed game editor tools so that the user can use the previously installed game editor tools with the game editor application. In some embodiments, the first subset of game editing tools includes game editing tools that are installed on the server computing system and are remotely controlled through the game editor application. In some embodiments, the method further comprising: generating modified target data for the first game application based at least in part on the modified first game asset; comparing the modified target data to original target data for the game application to determine changes in the target data, and generating a delta target data for modification of the game application based at least in part on the comparison; and distributing the delta target data for updating the first game application installed on a second user computing system over a network. In some embodiments, the user system interfacing to the server has access to a portion of the asset data. In some embodiments, modified data is stored in an account associated with the user performing the modification. In some embodiments, users can download and install the game modification update through a game update distribution system. In some embodiments, game assets include at least one of computer readable code comprising game rules used for execution of the game application, virtual models, and/or virtual environments. In some embodiments, the game assets that are selected by the user are transferred to the user computing system by game editing application. In some embodiments, different computing devices have access to different subsets of tools based on individual computing profiles. In some embodiments, the computing profile identifies a type of the user computing system, hardware resources, and software resources on the user computing system. In some embodiments, a second set of game assets that are not accessible through the game editor client and are designated as private.

In another embodiment, a server computing system for editing game content within a game application comprising: at least one hardware processor configured with computer executable instructions that configure the at least on hardware processor to: receive a request to initiate edit a first game application from a user computing system, wherein the request is generated by a game editor client application installed on the user computing system that is remote to the server computing system and communicate with the server computing system using a public communication channel; determine a first computing profile of the user computing system; determine a first subset of game editing tools available to the user computing system based at least in part the first game application and the first computing profile, wherein the first subset of editing tools is a subset of a plurality of editing tools available for editing the first game application; provide a first user interface including the first subset of game editing tools within the game editor application; provide access to a first subset of game assets of the first game application, wherein the first subset of game assets are assets used during execution of the game application and are designated as publicly accessible; receive a request to modify at a first game asset of the first subset of game assets, the game asset being modified using a first game editing tool of the first subset of game editing tools; and modify the first game asset based on the request resulting in a modified first game asset.

Various embodiments of the system may include one, all, or any combination of the following features. In some embodiments, first subset of game editing tools includes game editing tools that were previously installed on the user computing system, wherein the game editor application interfaces with the previously installed game editor tools so that the user can use the previously installed game editor tools with the game editor application. In some embodiments, the first subset of game editing tools includes game editing tools that are installed on the server computing system and are remotely controlled through the game editor application. In some embodiments, the at least one hardware processor is configured with computer executable instructions that further configure the at least on hardware processor to: generate modified target data for the first game application based at least in part on the modified first game asset; compare the modified target data to original target data for the game application to determine changes in the target data, and generating a delta target data for modification of the game application based at least in part on the comparison; and distribute the delta target data for updating the first game application installed on a second user computing system over a network. In some embodiments, the user system interfacing to the server has access to a portion of the asset data. In some embodiments, modified data is stored in an account associated with the user performing the modification. In some embodiments, users can download and install the game modification update through a game update distribution system. In some embodiments, game assets include at least one of computer readable code comprising game rules used for execution of the game application, virtual models, and/or virtual environments.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 2A-2C provide embodiments of block diagrams illustrating game modification by multiple users within a virtual development environment.

DETAILED DESCRIPTION OF EMBODIMENTS

Overview

One of the difficulties of modifying game applications is providing access to source assets used by a game developer for the development of the game application. For example, development source data can be hundreds of gigabytes of data that is generated by the developers during the game development process. Much of the source data may be generated using commercial game development tools. Much of the source data may also be developed using proprietary tools or custom modifications to existing commercial tools designed by the developer. Many developers would like to give users the ability to make modifications to their game applications. However, the developers do not want to make their source data or their development tools publicly available.

Embodiments of the present application provide solutions to these problems by using a network-based game modification system. The network based game modification system can provide users with access to game application source data and editing tools through a game editor client. The game editor client can provide an interface by which the developers can provide access to public source data while preventing access to private game source data. Additionally, the game editor client can provide an interface for access to some of the developers tools. In some embodiments, the game editor client can act as a portal for streaming operation of editor tools that are executing on the developer computing systems. In some embodiments, the game editor client can provide a secure environment that allows users to download the editing tools for use by the user. The game editor client can provide for a controlled executing environment where the user can control the parameters of execution of the game editor tools. A modification to a game or modification file used to update and change aspects of the game application are generally referred to as herein as a "MOD."

Overview of Video Game Environment

Figure 1:
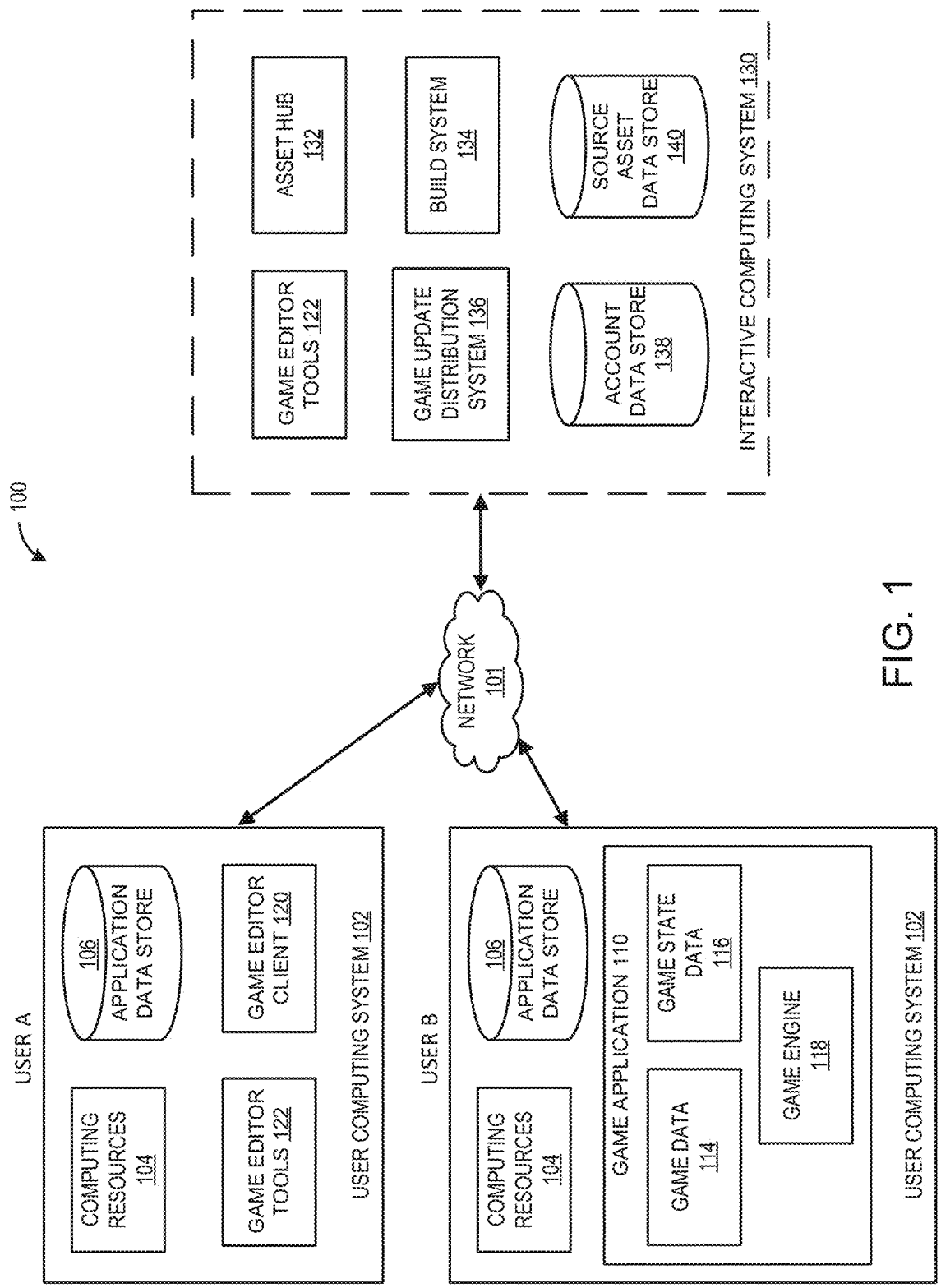
FIG. 1 illustrates an embodiment of a computing environment that can implement one or more embodiments of a network-based video game modification system.

FIG. 1 illustrates an embodiment of a computing environment 100 for implementing a game editor client 120. The environment 100 includes a network 101, user computing systems 102 associated with User A and User B, and an interactive computing system 130. To simplify discussion and not to limit the present disclosure, FIG. 1 illustrates only exemplary user computing systems 102, and an interactive computing system 130, though multiple systems may be used.

The user computing system 102 may communicate via a network 101 with the interactive computing system 130. Although only one network 101 is illustrated, multiple distinct and/or distributed networks 101 may exist. The network 101 can include any type of communication network. For example, the network 101 can include one or more of a wide area network (WAN), a local area network (LAN), a cellular network, an ad hoc network, a satellite network, a wired network, a wireless network, and so forth. In some embodiments, the network 101 can include the Internet.

A. User Computing Systems

FIG. 1 illustrates exemplary user computing systems 102 associated with User A and User B. A user computing system 102 may include hardware and software components for establishing communications over a communication network 101. For example, the user systems 102 may be equipped with networking equipment and network software applications (for example, a web browser) that facilitate communications via one or more networks (for example, the Internet or an intranet). The user computing system 102 may have varied local computing resources 104 such as central processing units (CPU) and architectures, memory, mass storage, graphics processing units (GPU), communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. The specific hardware and software components of the user computing systems 102, are referred to generally as computing resources 104. In some embodiments, the user computing system 102 may include one or more of the embodiments described below with respect to FIG. 7.

The user A system is illustrated as including the game editor client 120 (also referred to as a game development client or a dynamic development client). The user B system illustrates a traditional installation of a game application 110, installed on the user computing system. The configurations of the systems are not meant to be limiting, and the user B system may include the game editor client 120. The user A computing system may not be configured to execute a game application 110 locally on the system. For example, the user A computing system may not have hardware and/or software computing resources that are capable of executing the game application.

1. Game Application

The user computing system 102 can execute a game application 110 based on software code stored at least in part in the application data store 106. The game application 110 may also be referred to as a videogame, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to game simulation, rendering, animation, and other game data. In the illustrated embodiment, the game application 110 includes a game engine 118 and game data 114, game state information 116. When executed, the game application is configured to generate a virtual environment for a user to interface with the game application.

In some embodiments, the user computing system 102 can execute machine readable instructions that are configured to execute a game application 104, such as a video game, stored on a data store on the user computing system (e.g., application data store 106). The game application may be configured to execute a game application stored and/or executed in a distributed environment using a client/server architecture. For example, the user computing system 102 may execute a portion of a game application and the interactive computing system 130, or an application host system 132 of the interactive computing system 130, may execute another portion of the game application. For instance, the game application may be a massively multiplayer online role-playing game (MMORPG) that includes a client portion executed by the user computing system 102 and a server portion executed by one or more application host systems 132. For the present discussion, the game application 110 can execute on the user computing system 102 or a distributed application that includes a portion that executes on the user computing system 102 and a portion that executes on at least one of the application host systems 122.

i. Game Engine

During operation, the game engine 118 executes the game logic, controls execution of the simulation of gameplay, and rendering within the game application 110. The game engine 118 can include a simulation engine and a presentation engine. The simulation engine executes the game logic and controls execution of the gameplay simulation. The presentation engine controls execution of presentation of the gameplay and rendering of frames.

The simulation engine reads in game rules and generates game state based on input received from one or more users. The simulation engine can control execution of individual virtual components, virtual effects and/or virtual objects within the game application. The simulation engine can manage and determine character movement, character states, collision detection, derive desired motions for characters based on collisions. The simulation engine receives user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear and/or angular) of body parts and motions provided by a character movement module, which can be in the form of a set of force/torque vectors for some or all body parts. From this information, the physics engine generates new poses for the characters using rules of physics and those new poses can be used to update character states. The game device provides for user input to control aspects of the game according to game rules. Game rules might be specified in instruction form on game media. Examples of game rules include rules for scoring, possible inputs, actions/events, movement in response to inputs, and the like. Other components can control what inputs are accepted and how the game progresses, and other aspects of gameplay.

The simulation engine can output graphical state data that is used by presentation engine to generate and render frames within the game application. Each virtual object can be configured as a state stream process that is handled by the simulation engine. Each state stream process can generate graphical state data for the presentation engine. For example, the state stream processes can include emitters, lights, models, occluders, terrain, visual environments, and other virtual objects with the game application that affect the state of the game. The execution of the simulation engine is described in further detail herein.

The presentation engine can use the graphical state data to generate and render frames for output to a display within the game application. The presentation engine can to combine the virtual objects, such as virtual characters, animate objects, inanimate objects, background objects, lighting, reflection, and the like, in order to generate a full scene and a new frame for display. The presentation engine takes into account the surfaces, colors textures, and other parameters of the virtual objects. presentation engine can then combine the virtual objects (e.g., lighting within the virtual environment and virtual character images with inanimate and background objects) to generate and render a frame.

ii. Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in the data store 134, in such embodiments, game data may be received during runtime of the game application.

iii. Game State Data

During runtime, the game application 110 can store game state data 116, which can include a game state, character states, environment states, scene object storage, route information and/or other information associated with a runtime state of the game application 110. For example, the game state information 116 can identify the state of the game application 110 at a specific point in time, such as a character position, character orientation, character action, game level attributes, and other information contributing to a state of the game application. The game state data can include simulation game state data and graphical game state data. The simulation game state data includes the game state data that is used by the simulation engine to execute the simulation of the game application. The graphical game state data includes the game state data that is generated based on the simulation state data and is used by the presentation engine to generate and render frames for output on a display.

2. Game Editor Client

Figure 4A:
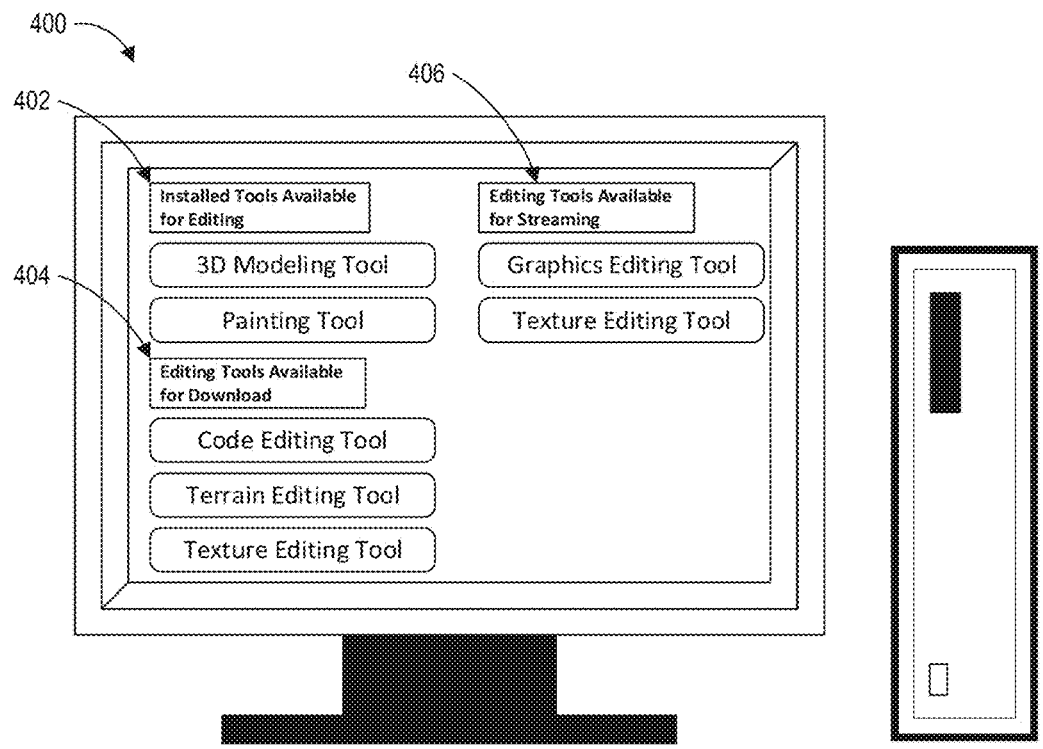
FIGS. 4A and 4B illustrate embodiments user interfaces of the game editor client on different computing systems.
Figure 4B:
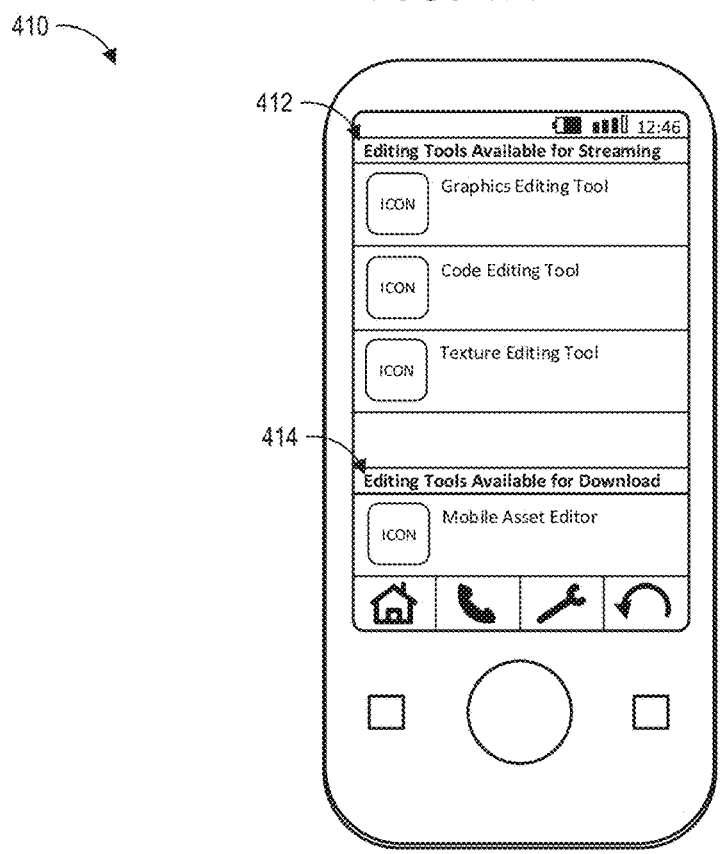

The game editor client 120 provides an interface for the user to modify an existing game application. In some embodiments, the game editor client 120 may include user account interface that requires the user to login or create a user account in order to access the game development functionality of the interactive computing system 130. The game editor client 120 can be dynamically configured based on the type of user computing system that is executing the game editor client 120. The game editor client 120 can generate a computing profile of the user computing system in order to determine the types of game editor tools 122 that can be used by the user computing system. The computing profile can also determine the types of source assets that can be modified by the user computing system. The game editor client 120 can have different interfaces based on the type of computing system that is executing the game editor client 120. Embodiments of different interfaces are illustrated in FIGS. 4A and 4B.

Different computing devices can have access to different types of game editor tools 122. For example, a smart phone can have different editing functionality than a tablet, laptop or desktop computing device. Each computing device has different computing resources and can have different types of game editor tools 122 that can function appropriately on the computing device. In some embodiments, the computing device can be a virtual reality system. The game editor client 120 can use the computing profile to identify a subset of the editing tools that are available to the user computing system. A user computing system may not have access to all the game editor tools 122 available. For example, a desktop may not have access to tools that are specific to execution within a mobile computing environment, such as a smart phone.

The game editor client 120 can provide a list of options of tools that are available to the user. The list of options may allow the user to select tools based on the type of modification that the user would like to perform on the game application. The user may utilize less than all the tools available to a particular computing device. The game editor client 120 may identify game editor tools 122 that are available for download by the user, game editor tools 122 that are available for streaming by the user, and/or game editor tools 122 that have been previously installed on the user computing system.

For game editor tools 122 that are available for download, the game editor client 120 can provide access to the game editor tools 122 to be installed locally in volatile or non-volatile memory on the user computing system. The game editor client 120 may operate like a host client application that controls access to game editor tools 122 that are installed on the user computing system. The game editor client 120 may have access restrictions that prevent installed game editor tools 122 from being used for other purposes or with assets that are not approved. For example, the game editor client 120 may require that any assets modified or created using the tool are saved in a network-based data store (e.g., account data store 138) and prevent the user from saving assets locally on the user computing system.

In some embodiments, a game editor tool 122 may be executed on a remote server (e.g., the interactive computing system 130) and the game editor client 120 may stream the execution of the game editor tool 122 to the user computing system. The game editor client 120 can provide a user interface for the remotely executed game editor tool 122. The availability of a game editor tool 122 for streaming may be based the computing profile of the user computing system, requirements associated with the game editor tool 122, and/or the requirements associated with the game application 110.

In some instances, the game editor tools 122 that are available to a particular user may be based on the software that has been previously installed by the user on the computing system. For example, some game editor tools 122 may require a license in order to utilize the tools. The game editor client 120 can be configured to interface directly with these tools (such as through an extension installed on the tool) or may be configured to launch the tool on the user computing system, among other interactions. For example, the game editor client 120 may be configured to provide for the game editor tool 122 to access the source assets located on the source asset data store.

The game editor client 120 can provide an interface through which the user can access the asset hub 132 and source asset data store 140. The source asset data store 140 provides access to source assets that a user can modify. The source assets access can be divided into various different categories, such as public and private source assets. Private source assets may include assets that are not available to a user, and cannot be modified by the user. In some embodiments, the user may only be provided with a view of the source assets that are available for modification by the user. In some embodiments, the user may be able to see a listing of source assets that are not available for modification. This can help the user to know what types of MODs that the user can be created for the game application 110. Some source assets, may have different types of restrictions based on the type or importance of asset. For example, some assets may be available for modification, but may not be downloaded locally on the user computing system for offline use of the asset by the user. In such an example, a developer may not want a user to be able to download a 3D model asset for a model in the game application 110, but may allow the user to modify the asset when creating a MOD. This can help to prevent the unauthorized use of assets outside of game application 110. Based on the computing profile, game editor tool 122 requirements, game application 110 requirements, the interactive computing system 130 can determine the game editor tools 122 that are available the user computing system and the source assets that can be modified by the user computing system.

3. Game Editor Tools

The game editor tools 122 (also referred to as game development tools) can refer to proprietary tools created or used by the developer, commercially available tools, extensions to commercially available tools, and/or other types of software applications that can be used to modify or create source assets for a game application 110. The developer game editor tools 122 may include game application 110 specific tools that can be used to modify the source assets within the game. For example, interactive computing system 130 may have a specific engine that is used to build the game application 110. The game editor tools 122 may include the engine, other tools that the user can use to interface with the source assets of a game application 110. The game editor tools 122 can refer to commercial game development programs such as 3ds Max, Maya, Z-brush, Visual Studio, Blender, and other tools that are used. The tools may be locally installed on the user computing system or may be installed on the interactive computing system 130 and available for streaming to the user computing system. Generally, the game editor tools 122 an be any commercially available tool, developer specific, and/or game application 110 specific tools that can be used to modify or create source assets for the game application 110.

Virtual Environment

As used herein, a virtual environment may comprise a simulated environment (e.g., a virtual space) instanced on a user computing system 102, a server (e.g., the interactive computing system 130) that is accessible by a client (e.g., user computing system 102) located remotely from the server, to format a view of the virtual environment for display to a user of the client. The simulated environment may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

The game instance of the video game may comprise a simulated virtual environment, e.g., a virtual environment that is accessible by users via clients (e.g., user computing systems 102) that present the views of the virtual environment to a user. The virtual environment may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

It should be understood the above description of the manner in which state of the virtual environment associated with the video game is not intended to be limiting. The game application may be configured to express the virtual environment in a more limited, or richer, manner. For example, views determined for the video game representing the game state of the instance of the video game may be selected from a limited set of graphics depicting an occurrence in a given place within the video game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the video game are contemplated.

The game engine generates game state information that may be used locally within the game application and may be transmitted to the interactive computing system 130 over network 101. The execution of the instance of the game application may include determining a game state associated with the game application. The game state information may facilitate presentation of views of the video game to the users on the user computing systems 102. The game state information may include information defining the virtual environment in which the video game is played. The execution of the game engine is described in further detail herein.

The execution of the game instance may enable interaction by the users with the game application and/or other users through the interactive computing system 130. The game application may be configured to perform operations in the game instance in response to commands received over network 101 from user computing systems 102. In some embodiments, users may interact with elements in the video game and/or with each other through the video game.

Users may participate in the video game through client game applications implemented on user computing systems 102 associated with the users. Within the game instance of the video game executed by the game engine, the users may participate by controlling one or more of an element in the virtual environment associated with the video game. The user-controlled elements may include avatars, user characters, virtual environment units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual environment. The user characters may include heroes, knights, commanders, leaders, generals and/or any other virtual environment entities that may possess strength, skills, abilities, magic powers, knowledge, and/or any other individualized attributes. The virtual environment units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the video game.

The user-controlled element(s) may move through and interact with the virtual environment (e.g., user-virtual environment units in the virtual environment, non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, and/or other communications. Communications may be received and entered by the users via their respective user computing systems 102. Communications may be routed to and from the appropriate users through server(s) (e.g., through application host system 132).

Execution and/or performance of the user action by the game engine 112 may produce changes to the game state, which may reflect progresses and/or results of the user actions. In some examples, state changes caused by the execution of the user actions may be recorded in the application data store 106 and/or data store 134 to facilitate persistency throughout the instance of the video game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual environment. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual environment locations controlled by or associated with the users; craft or transport virtual items; interact with, compete against or along with non-player entities and/or virtual environment elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual environment. In some examples, the given user may input commands to compete against elements in an environment within the virtual environment—e.g., Player vs. Environment (PvE) activities. In some examples, the given user may input commands to compete against each other within the virtual environment—e.g., Player vs. Player (PvP) activities.

The instance of the video game may comprise virtual entities automatically controlled in the instance of the video game. Such virtual entities may or may not be associated with any user. As such, the automatically controlled virtual entities may be generated and/or developed by artificial intelligence configured with the game application and/or server(s) interactive computing system 130 by a provider, administrator, moderator, and/or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (e.g., application host system 132). As used herein, such automatically controlled virtual environment entities in the instance of the video game are referred to as "non-player entities."

In an online game, the instance of the video game may be persistent. That is, the video game may continue on whether or not individual users are currently logged in and/or participating in the video game. A user that logs out of the video game and then logs back in some time later may find the virtual environment and/or the video game has been changed through the interactions of other users with the video game during the time the user was logged out. These changes may include changes to the simulated physical space, changes in the user's inventory, changes in other users' inventories, changes experienced by non-user characters, and/or other changes.

B. Interactive Computing System

The interactive computing system 130 may include an asset hub 132, a build system 134, a game update distribution system 136, and account data store 138, and a source asset data store 140. The interactive computing system 130 may be configured to host execution of one or more game editor tools 122 for use by the user computing system. In some embodiments, the interactive computing system 130 can include one or more computing devices, such as servers and databases that may host and/or execute a portion of one or more instances of the game editor tools 122 and the game update distribution system. The interactive computing system 130 can be configured to interface with the game editor client 120s executing on user computing systems and provide for the modification of game applications 110.

Additionally, the interactive computing system 130 may additionally include one or more computing systems configured to execute a portion of the game application 110. The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instanced (e.g., a first person shooter multiplayer match) or a persistent virtual environment (e.g., a multiplayer online roll playing game). The virtual environment may enable one or more users to interact with the environment and with each other in a synchronous and/or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing devices.

1. Asset Hub

The asset hub 132 can manage and control user access to the source asset data store of a game application 110. The asset hub 132 can create a new instance of an asset hub for each MOD that a user creates. The asset hub 132 may be specific to a game application 110. The asset hub 132 manages the modification and creation of new assets for a user's MOD. The asset hub can provide a server-side management module that interfaces with the game editor client 120 to manage the source assets of a game application MOD. The asset hub 132 can include various management functions for managing assets for a user, such as version control, checking in/checking out assets, source asset versions, and other management functions. The asset hub 132 can prevent multiple users from working simultaneously on the same source asset, or at least the same portions of an asset, some assets may provide for different aspects of the asset to be modified simultaneously. The asset hub 132 can provide for a user to select an available asset, download the asset, modify the state of the asset, and then store the changes and the correct versions in a user's account. The asset hub 132 can interface with the build system 134 to produce an updated MOD build using the correct versions of new and modified source assets.

2. User Account Data Store

The interactive computing system 130 can include one or more account data stores 134 that are configured to store user account information associated with one or more game applications. The user account data can be configured to store source assets for MODs associated with a user account. For example, the user account data store may store a copy of each source asset created and/or modified by the user.

3. Source Asset Data Store

The source asset data store 140 can store source assets for a game application 110. For each game application, the source assets can be divided between public source assets and private source assets. Public source assets can include source assets that are available for modification by users. The source asset data store 140 may be the same source asset data store 140 used by internal developers to access source assets of the game application 110. The public source assets can be accessed (e.g., via download) and are available for the user to modify for a MOD of the game application 110. The private assets can include assets that have been designated as private and cannot be modified by a user. In some embodiments, a user may have read access to a private asset. In some instances, the private assets can be edited by a user that has a secure connection to the interactive computing system 130, such as a developer computing system interfacing with the source assets through a VPN connection or through an internal connection within a game development studio (e.g., intranet). The private source assets may be source assets that are related to aspects of the game application that the developer does not want to be made available disclose to the public for modification or review (e.g., source code of a game engine or rendering engine). The user may have access to source assets, such as code that defines game affecting gameplay, but may have restrictions preventing access to designated models within the code. Each game application can define its own access parameters that define public and private source assets. In some instances, the source assets may not have any private assets and all the source assets may be categorized as public source assets.

4. Build System

The build system 134 provides software tools that are configured to automate the process of program compilation. The build system 134 can be configured to create executables based on data received from the asset hub 132. The build system 134 provides for a functional based languages mapping of a set of source assets (e.g., assets from source asset data store 140 and user account data store 138) to target build data (e.g., modified target data in FIG. 3).

The build system can be configured to perform build actions in order to perform partial rebuilds of only the assets that have changed by the MOD within the game application. The asset hub of the user can be used to identify the changes that have been made to the assets. Since the interactive computing system 130 already has a complete build of the game application 110, the build system 134 may not need to do a complete rebuild of the game application 110 each time the assets are modified. The build system 134, in conjunction with the asset hub 132, can identify dependencies of new or modified source assets in order to generate a new MOD build. The build system may be configured to generate modular builds for larger applications. The modules may be configured so that they can be independently compiled, which can significantly reduce the build time of the build process. The build system can be implemented using the resources of the interactive computing system 130.

By having the interactive computing system 130 perform the builds, this can provide significant advantages to the user in preparation of builds based on modifications to the game application 110. For example, in order to perform of a build of a large system, the user may be required to download the entire source code of the game application 110, which could be hundreds of gigabytes of data. Additionally, the user would have to compile the game application 110 using the processing resources of the user's personal computing system, whereas, the build system 134 can compile remotely using the resources of the interactive computing system 130 (or independent build servers) and utilize existing build modules and resources that already been compiled by the interactive computing system 130 for the game application 110.

Embodiments of Modifying a Game Application

Figure 2A:
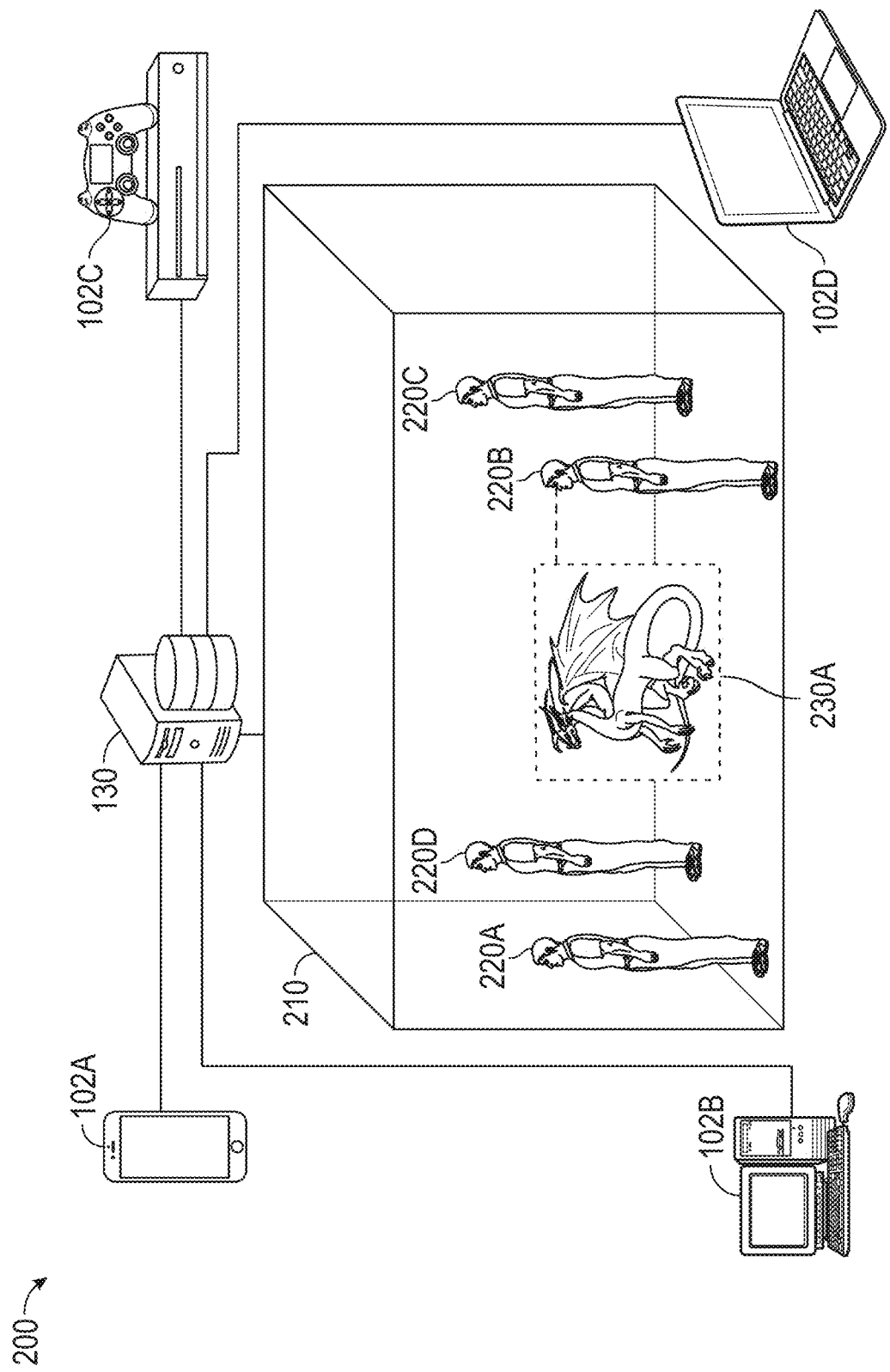
Figure 2B:
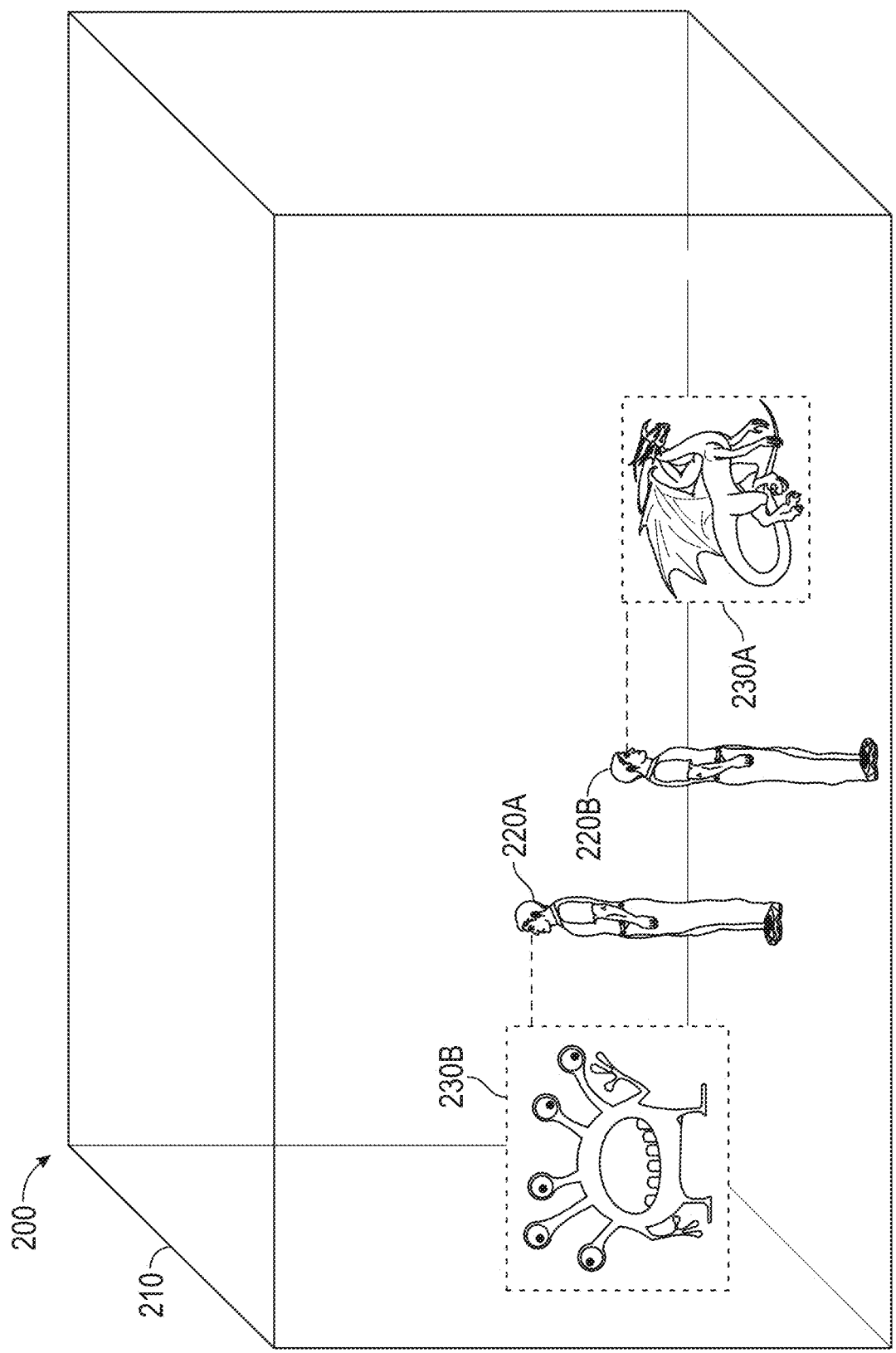

FIG. 2A-2C illustrate an embodiment of a computing environment 200 for modification of a game application 110. In the illustrated embodiment, the interactive computing system 130 can provide access to a developer virtual environment 210. The developer virtual environment 210 can allow for editing of source assets of the game application 110 by one or more users. The asset hub 132 can control access to source assets that are within developer virtual environment. The developer virtual environment can provide for multi-user editing of source assets. In some game applications 110 it can be beneficial to modify and create virtual assets within a shared developer virtual environment that is the same as the virtual environment used during execution of the game. The computing environment 200 can include user computing systems 102A, 102B, 102C, 102D (collectively referred to herein as user computing systems 102), an editor hub 106, and a virtual space 108. To simplify discussion and not to limit the present disclosure, FIGS. 2A-2C illustrate only one of certain elements (for example, a single interactive computing system 130), though multiple systems may be used. The user computing systems 102 can include a mobile phone, a desktop, a laptop, a gaming console, or the like.

The interactive computing system 130 can include one or more processors executing computer readable instructions for creating a virtual environment 210 that the user computing systems 102 can connect to. Although certain network connections are illustrated between systems and devices, multiple distinct and/or distributed networks may exist. The network may include a local network.

The location of the user may be indicated to other users within the environment 210. The personas 220A-220D (collectively, referred to herein as 220) can represent the location of the user within the development virtual environment 210. In some embodiments, the persona 330 may be represented by an avatar or other indication of the user in the virtual environment 210. The virtual personas 220 can help the users identify what assets other users are focusing on in the virtual environment 210.

The user computing systems 102 can select virtual content 230 in the virtual environment. For example, the user computing system 102B, via the persona 220B can select a dragon 230A. The command for the selection 118 can be sent to the asset hub 132, which can generate an indication of the selection to be sent to the other user computing systems. The indication of the selection can be sent to the other user computing systems 102A, 102C, 102D. As such, the other user computing systems 102A, 102C, 102D can see that the user computing system 102B currently selected the dragon 230A. In some embodiments, the indication can include a color, size, texture, outline, an enclosure (such as a box or circle around the selected virtual content), and/or the like. The indication can include a pointer, such as a laser pointer, from the associated avatar to the virtual content.

FIGS. 2B and 2C illustrate modifications to source assets 230 within the development virtual environment 210. In FIG. 2B, user 220A selects virtual content 230B, a five-eyed monster. The selection can be displayed to the other users (e.g., user 220B) that the virtual content 230B has been selected. User 220B selects another virtual content 230A, a dragon.

In FIG. 2C, user 220A makes modifications to the virtual content 230B (e.g. less eyes and different teeth) and user 220B makes modifications to virtual content 230A (e.g. a larger dragon). The modifications can be saved and stored by the asset hub 132.

Embodiment of Build Process

Figure 3:
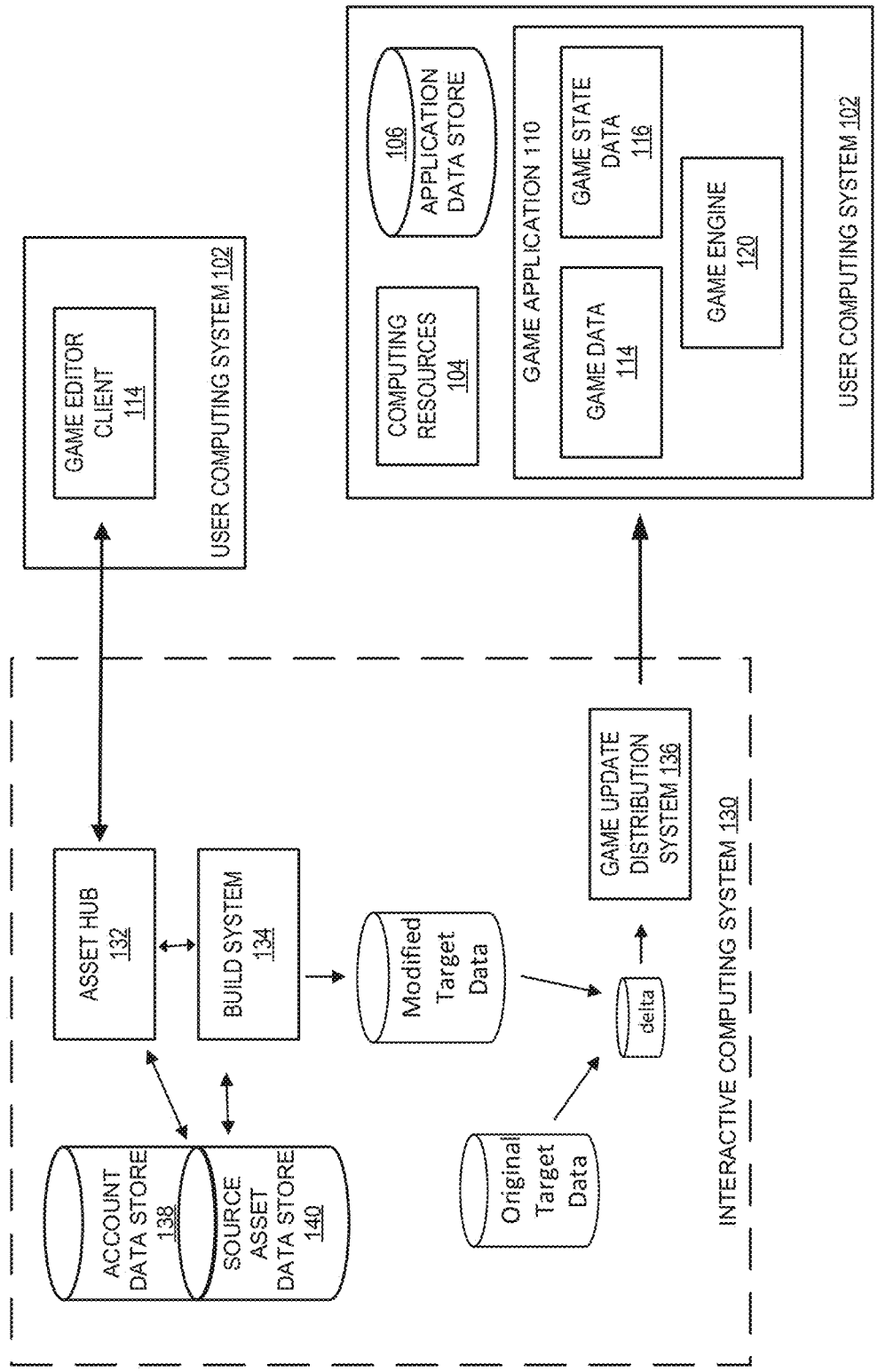
FIG. 3 provide embodiments of block diagrams illustrating a process for creating a build of a modification to a game application.

FIG. 3 provides a block diagram 300 illustrating an embodiment of a build process of a MOD for distribution to a user computing system. The build process can begin based on a requested received by the asset hub 132 from the game editor client 120. The game editor client 120 may be configured such that a user has the option to select different versions of source assets and/or modified source assets, when generating the instructions for the build. Creating different builds using different versions of resources can help with troubleshooting problems that may be encountered when the user is testing the MOD. The user account may store each of the builds of that the user has created. The game editor client 120 can instruct the asset hub 132 to implement a build process based on modifications to source assets by a user. The asset hub 132 can communicate with the build system 134, the account data store 138 and the source asset data store 140 to execute the build commands based on the instructions received from the game editor client 120.

The build system 134 can be configured to generate modified target data based on the modifications to the game application 110 contained within the MOD. The modified target data can refer to the target data that has been generated by the build system based on the MODs that were generated by the user. The modified target data can be generated based on information from the source asset data store 140, the asset hub 132, and the account data store 138. The modified target data may be modular based on the game application 110. For example, a subset of the total number of build modules of a game application may be generated for the modified target data. Depending on the scope of changes generated for the MOD, the modified target data may be limited to a build of a single game module or a rebuild of the entire game application. The build system can automatically identify all the dependencies associated with any modifications performed by a user. When performing the modified target data, the build system can automatically incorporate and modify any modules that need to be incorporated into and/or modified in conjunction with the creation of the build of the modified target data.

The original target data can refer to original build data that has been previously generated for the game application 110. The original target data can have multiple versions of the data and the user may select one of the versions of the original target data that has already been built as the original target data for a build project. The user may select one of the versions of the original build data of the game application 110. For example, the user may have started the MOD when version 1.1 was available, but after starting the MOD, the game application 110 was updated to version 1.2. Depending on the modification that the user is making to the game application 110, the user may select the build that is going to be used as the original build file, such as 1.1 or 1.2.

The build system 134 can analyze the original target data and the modified target data to identify differences between the original target data and the modified target data. The delta target data can refer to the data than needs to be modified within the source asset data in order to implement the MOD within the game application 110. The determination of the delta target data may involve a detailed analysis of the differences between the original target data and the modified target data. For example, the delta may identify portions of a specific asset rather than identifying an entire asset. For example, the wheels of a car may need to be modified without changing the rest of the car. The delta target data can identify the data that needs to be modified and included in order to generate a game modification patch. The game modification patch is used to update the game application so that it can execute the MOD. After the game modification patch is generated, the user can test the game modification patch to determine whether it is executing correctly. For example, the user can execute the game application with the MOD installed and test execution of the game application. The user can then send instructions to distribute the game modification patch to other user computing system.

The game update distribution service 136 can provide the game modification patch for distribution to remote user computing systems that choose to implement the MOD. The game modification patch is generated based on the delta target data. The game modification can be distributed using the game update distribution service 136 without requiring the user to go through a process of using third party tools to download and install MODs onto their user computing system. This process additionally allows for interactive computing system 130 to verify that the MODs safe to execute on a user computing system.

Embodiments of Game Editor Client on Different Computing Platforms

FIGS. 4A and 4B provide illustrative examples of options of tools that are available on different types of user computing systems. FIG. 4A illustrates a user interface of a game editor client 120 that is operating on a desktop computing system 400. FIG. 4B illustrates a user interface of a game editor client 120 that is operating on a smart phone 410. The desktop computing system illustrated in 4A has a plurality of tools that are installed locally 402 on the system, a plurality of tools that are available for download 404 and a plurality of tools 406 that are available for use by streaming the tools through the application. The smart phone 410 illustrated in 4B has no tools that are installed locally, a tool 414 that can be installed locally on the smart phone, and a plurality of tools 412 that are available for streaming to the smart phone. As illustrated, the tools available to both platforms can differ. For example, each user computing system can have different sets of tools that are available to install based on the computing system based on the operating system of the user computing system. For example, the smart phone may have a mobile specific application that is not available to the desktop. As further described herein, the interactive computing system 130 can dynamically determine and provide access to editing tools based on computing profile associated with the user computing system.

Process for Modifying a Game Application

Figure 5:
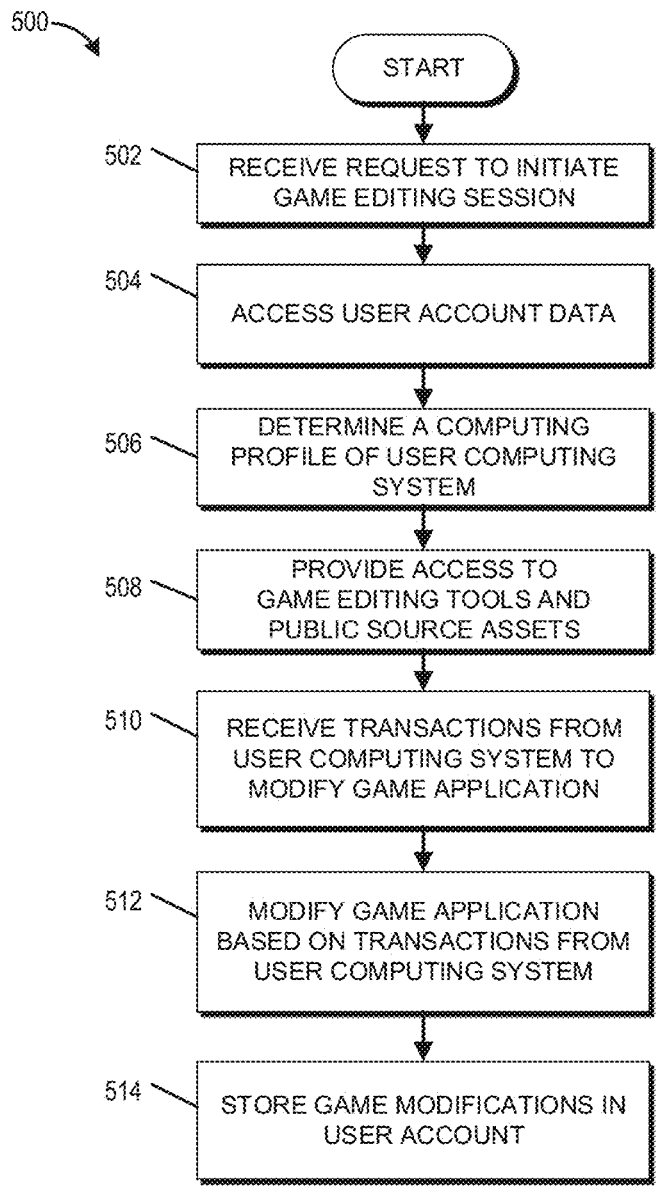
FIG. 5 illustrates an embodiment of a flowchart of a process for generating a modification of a game application using a game editor client.

FIG. 5 illustrates an embodiment of a flowchart of process 500 for modifying a game application using a game editor client 120 that can provide game editing resources based on the computing characteristics of a user computing system. The processes, in whole or in part, can be implemented by CPUs and/or GPUs configured with computer readable instructions to execute a game modification system on a server (e.g., interactive computing system 130) communicating with a client (e.g., user computing system 102) over a network. For example, the processes, in whole or in part, can be implemented by the interactive computing system 130, asset hub 132, build system 134, account data store 138, source asset data store 140, and game editor client 120. Although any number of systems, in whole or in part, can implement the processes, to simplify discussion, the processes will be described with respect to the interactive computing system 130 and components thereof.

At block 502, the interactive computing system 130 receives a request to initiate a game editing session on a user computing system 102. The request can come from the game editor client 120 executing on the user computing system 102. In some embodiments, the request may come from another application on the user computing system 102, such as a browser application. In some embodiments, the browser application may be instructed to initiate a download of the game editor client 120 in order to continue the process of editing the game application. In some embodiments, the browser application may function as the game editor client 120 for at least a portion of the process 600. The request can include user account credentials and login information associated with the user. The user can log in on the game editor client 120 and can establish communication with the interactive computing system 130. The request can identify a game application for which the user is requesting the game modification session.

At block 504, the interactive computing system 130 access a user account data associated with the request to initiate the game editing session. The user account may include one or more MODs that is associated with the user account. A MOD may be stored in association with one or more user accounts. For example, a user account may have access to MODs that are created by other users that have shared the MOD with the user. The user can access and can continue to work on the MOD. The user can access source data that the user has modified and the source data that other users have modified or created. The asset hub 132 can be responsible for communicating with the game editor client 120. In this manner, the user can access a list of assets that have been edited or created for a specific MOD. After the interactive computing system 130 looks up the information associated with the game editing request. The interactive computing system 130 can transmit the data to the game editor client 120 related to the account and the user request.

At block 506, the interactive computing system 130 can be configured to determine a computing profile of the user computing system 102. The computing profile can identify hardware resources (such as, CPU resources, GPU resources, memory, and other hardware resources), firmware information, device driver information, software information (such as operating system, browser type, software installed, software versions, and other software information), network information (such as, IP address, latency, bandwidth, and other network information), and other information associated with the user computing system 102. The computing profile can be used to determine the types of editing tools that are available for use by the user computing system 102.

At block 508, the interactive computing system 130 can provide access to game editing tools and public game assets. The interactive computing system 130 can determine which editing tools to provide to the user based on the on the computing profile of the user computing system. For example, the game editor client 120 can provide a user interface that identifies the editing tools that the game editor client 120 can use to MOD the game application 110. The editing tools may be installed locally on the user computing system, may be available by streaming the tools from the interactive computing system 130 to the user computing system through the game editor client 120, or may be available for download onto the user computing system through the game editor client 120. For tools that are were previously installed on the user computing system, the game editor client 120 can provide an interface through which the tools can communicate with the asset hub. The tools can conduct transactions with the asset hub in order to create and/or modify game assets.

In some embodiments, the interactive computing system 130 can stream the editing tools to the user computing system. In such an embodiment, the interactive computing system 130 may initiate execution of a client instance in order to provide editor tools to the game editor client 120. The game is executed using the computing resources of one or more servers of the interactive computing system 130. The execution of the editing tools on the client instance may be the same as if the editing tools were being executed on the user computing system 102 with the exception that the rendered frames would be provided to the user computing system 102 from the client instance 140. The user interface of the game editor client 120 can be a video player that provides the same functionality as the user interface of the editor tools executing locally on the user computing system. For example, though the interface is a video stream of the game application, elements of the user interface displayed within the video stream provide the same functionality if the user selects the portion of the UI associated with the UI element.

The game editor client 120 can provide access to the public source assets of the game application 110. The public source assets are a subset of the total source assets associated with the game application 110. The game application 110 includes source assets that are designated as private source assets and cannot be modified by the user. Additionally, the game editor client 120 and/or asset hub 132 may provide one or more filtering mechanism that automatically filter the available game assets based on the tools that are available on the user computing system. In some embodiments, the user can perform game modification in a development game environment. The user may be able to see other user users that are concurrently modifying games assets within the development virtual environment. For example, a first user may be modifying a tree and a second user may be modifying a castle.

At block 510, the interactive computing system 130 receives transactions from the user computing system 102 to modify the game application 110. The transactions can be changes to existing source assets and/or the creation of new source assets.

At block 512, the interactive computing system 130 modifies the game application based on the transactions received from the user computing system. The modification to the game assets can be updated as soon as the transactions are processed by the asset hub.

At block 514, the game application modifications can be stored within the user account. Updating the user account can update the account for all user that have access to the account. The updates can be visualized as soon as they are complete by other users. For example, in a shared virtual development environment, modifications made to the tree by the first user could be updated for display to the second user.

Process for Building Game Modification Patch

Figure 6:
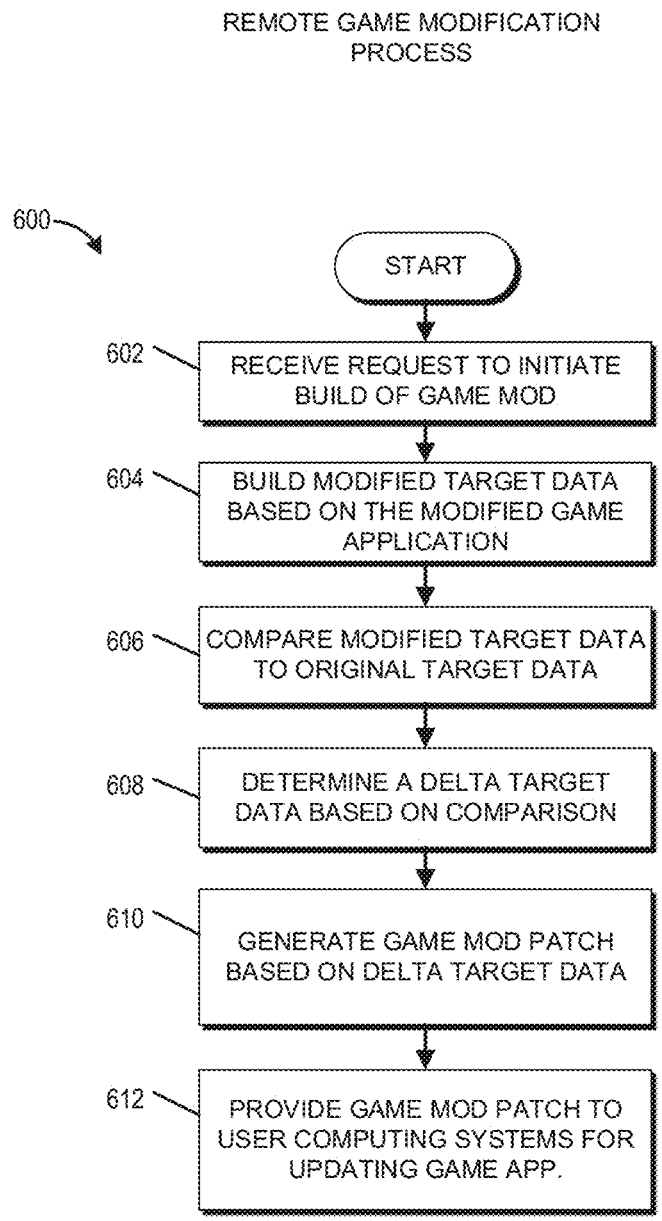
FIG. 6 illustrates an embodiment of a flowchart of a process for creating a build of a modification to a game application.

FIG. 6 illustrates an embodiment of a flowchart of process 600 for modifying a game application using a dynamic editing client. The processes, in whole or in part, can be implemented by CPUs and/or GPUs configured with computer readable instructions to generate a game modification patch on a server (e.g., interactive computing system 130). For example, the processes, in whole or in part, can be implemented by CPUs and/or GPUs configured with computer readable instructions to execute a game modification system on a server (e.g., interactive computing system 130) communicating with a client (e.g., user computing system 102) over a network. For example, the processes, in whole or in part, can be implemented by the interactive computing system 130, asset hub 132, build system 134, account data store 138, source asset data store 140, game editor client 120, and game update distribution system 136. Although any number of systems, in whole or in part, can implement the processes, to simplify discussion, the processes will be described with respect to the interactive computing system 130 and components thereof.

At block 602, the interactive computing system 130 receives a request to initiate a build of a game MOD based on changes to the game application stored by the user.

At block 604, the interactive computing system 130 can build modified target data based on the modified game application. The modified target data refers to the target data that has been generated by the build system based on the MODs that were generated by the user. The modified build data will be generated based on information from the asset data store and the asset hub. The user may have the option to select different versions of different modified assets, in order to make a plurality of different builds. The user account may store each of the builds the user has created. The modified target data may be modular based on the game application 110. For example, a subset of the total number of build modules of a game application may be generated for the modified target data. Depending on the scope of changes generated for the MOD, the modified target data may be used to rebuild a single module or it may be used to rebuild the entire game application. The build system can automatically identify all the dependencies associated with any modifications performed by a user. When performing the modified target data, the build system can automatically incorporate and modify any modules that need to be incorporated into and/or modified in conjunction with the creation of the build of the modified target data.

At block 606, the interactive computing system 130 can compare the modified target data to the original target data and the modified target data. At block 608, the interactive computing system 130 can determine delta target data based on the comparison. The delta target data can refer to the data than needs to be modified within the original target data in order to implement the MOD within the game application 110. The modified data may be parts of a specific asset. For example, the wheels of a car may need to be modified without changing the rest of the car. The delta can identify the data that needs to be included in the game modification patch in order to update the game application with the MOD.

At block 610, the interactive computing system 130 can generate a game modification data patch based on the delta target data. The system can automatically determine the modules of the game application that need to be updated in order to generate the patch that can then be executed by a remote user computing system.

At block 612, the interactive computing system 130 the game update distribution service can provide the game modification patch to user computing systems for updating the game application 110. The game update distribution service 136 can provide the game modification patch for distribution to remote user computing systems that choose to implement the MOD. The game modification patch is generated based on the delta target data. The game modification patch can be distributed using the game update distribution service 136 without requiring the user to go through a process of using third party tools to download and install MODs onto their user computing system. This process additionally allows for interactive computing system 130 to verify that the MODs safe to execute on a user computing system.

Overview of Computing Device

Figure 7:
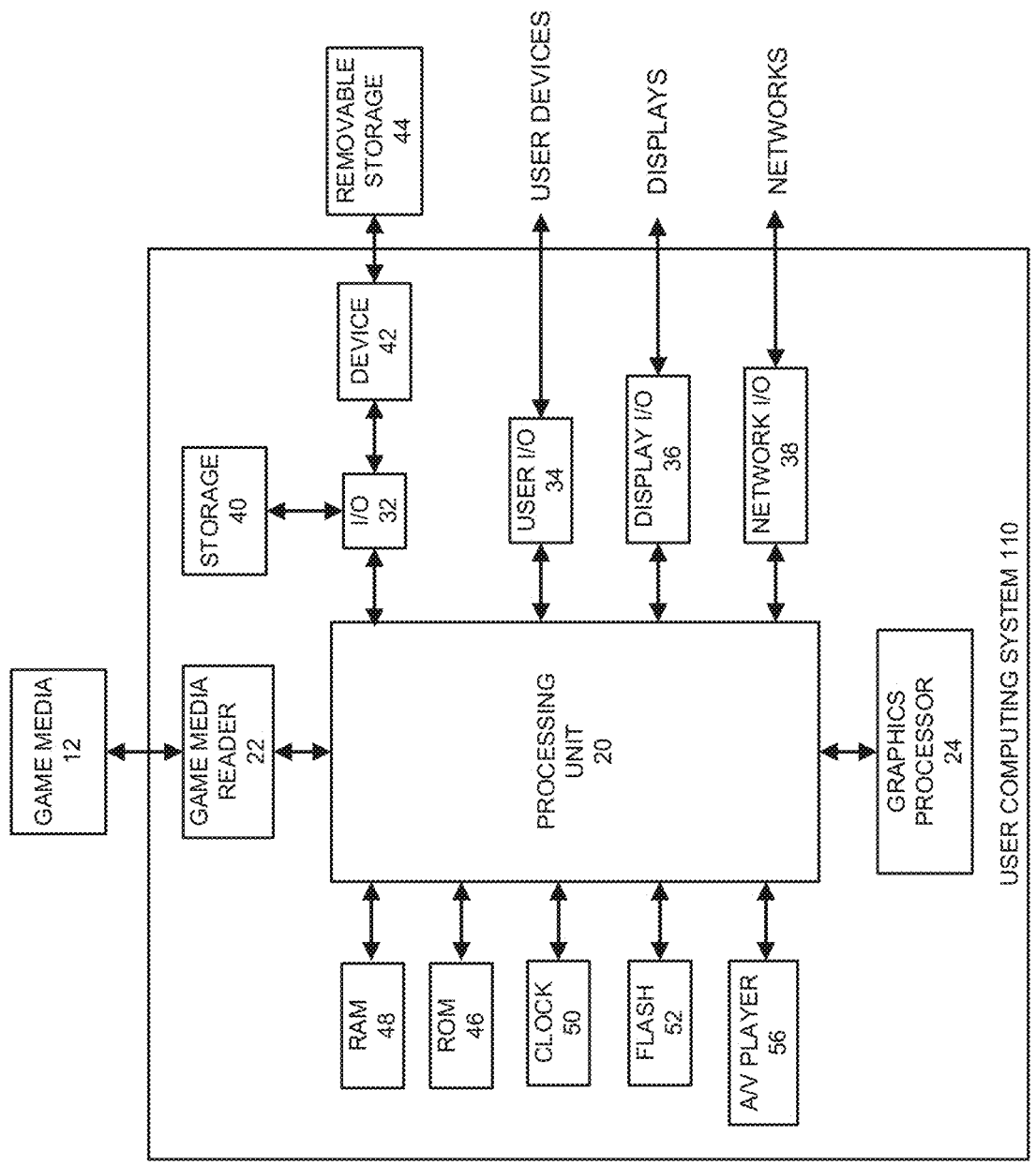
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen input. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for distributing game content modifications for a game application, the method comprising:
   by a server computing system comprising at least one hardware processor configured with computer executable instructions,
      receiving a request to initiate a build of modified target data for a first game application from a user computing system, wherein the request is generated by a game editor client application accessed by a user computing system that is remote to the server computing system, wherein the user computing system communicates with the server computing system using a public communication channel;
      generating modified target data for the first game application based at least in part on a modification to a first game asset, wherein the first game asset is from a first set of game assets of the first game application;
      comparing the modified target data to original target data for the first game application to determine differences between the modified target data and the original target data;
      determining delta target data for modification of the first game application based at least in part on the comparison;
      generating a game modification patch based on the delta target data, wherein the game modification patch is configured to update the first game application to include the modified target data; and
      distributing the game modification patch to a second user computing system over a network.

2. The computer implemented method of claim 1, wherein user computing systems download and install the game modification update through a game update distribution system.

3. The computer implemented method of claim 1 further comprising verifying the game modification patch is safe to execute on user computing systems.

4. The computer implemented method of claim 1, wherein the first set of game assets accessible through the game editor client application are designated as public, wherein the first set of game assets is a subset of game assets of the first game application.

5. The computer implemented method of claim 4, wherein the first set of game assets include at least one of computer readable code comprising game rules used for execution of the game application, virtual models, or virtual environments.

6. The computer implemented method of claim 4, wherein a second set of game assets of the first game application are designated as private and are not accessible through the game editor client.

7. The computer implemented method of claim 1 further comprising receiving a request to initiate a modification to the first game asset of the first set of game assets; and modifying the first game asset based on the request resulting in the modification to the first game asset.

8. The computer implemented method of claim 7, wherein the modification to the first game asset is a modification to a portion of data of the first game asset, wherein the delta target data identifies the modified portion of data of the first game asset and the game modification patch is configured to update the modified portion of data of the first game asset without updating the entire first game asset.

9. The computer implemented method of claim 1 further comprising:
   automatically identifying dependent data modules associated with the modification of the first game asset;
   modifying the dependent data modules; and
   incorporating the modified dependent data modules into the modified target data.

10. The computer implemented method of claim 1, wherein modified target data is stored in a user account associated with the user performing the modification.

11. A server computing system for editing game content within a game application comprising:
   at least one hardware processor configured with computer executable instructions that configure the at least on hardware processor to:
      receive a request to initiate a build of modified target data for a first game application from a user computing system, wherein the request is generated by a game editor client application accessed by a user computing system that is remote to the server computing system, wherein the user computing system communicates with the server computing system using a public communication channel;
      generate modified target data for the first game application based at least in part on a modification to a first game asset, wherein the first game asset is from a first set of game assets of the first game application;
      compare the modified target data to original target data for the first game application to determine differences between the modified target data and the original target data;
      determine delta target data for modification of the first game application based at least in part on the comparison;
      generate a game modification patch based on the delta target data, wherein the game modification patch is configured to update the first game application to include the modified target data; and
      distribute the game modification patch to a second user computing system over a network.

12. The server computing system of claim 11, wherein user computing systems download and install the game modification update through a game update distribution system.

13. The server computing system of claim 11, wherein the computer executable instructions further configure the server computing system to verify the game modification patch is safe to execute on user computing systems.

14. The server computing system of claim 11, wherein the first set of game assets accessible through the game editor client application are designated as public, wherein the first set of game assets is a subset of game assets of the first game application.

15. The server computing system of claim 14, wherein the first set of game assets include at least one of computer readable code comprising game rules used for execution of the game application, virtual models, or virtual environments.

16. The server computing system of claim 14, wherein a second set of game assets of the first game application are designated as private and are not accessible through the game editor client.

17. The server computing system of claim 11, wherein the computer executable instructions further configure the server computing system to:
   receive a request to initiate a modification to the first game asset of the first set of game assets; and
   modify the first game asset based on the request resulting in the modification to the first game asset.

18. The server computing system of claim 17, wherein the modification to the first game asset is a modification to a portion of data of the first game asset, wherein the delta target data identifies the modified portion of data of the first game asset and the game modification patch is configured to update the modified portion of data of the first game asset without updating the entire first game asset.

19. The server computing system of claim 11, wherein the computer executable instructions further configure the server computing system to:
   automatically identify dependent data modules associated with the modification of the first game asset;
   modify the dependent data modules; and
   incorporate the modified dependent data modules into the modified target data.

20. The server computing system of claim 11, wherein modified target data is stored in a user account associated with the user performing the modification.

\* \* \* \* \*